Sept. 15, 1936.   R. H. GREEN ET AL   2,054,747
TRANSMISSION MECHANISM
Filed Sept. 4, 1935   4 Sheets-Sheet 1
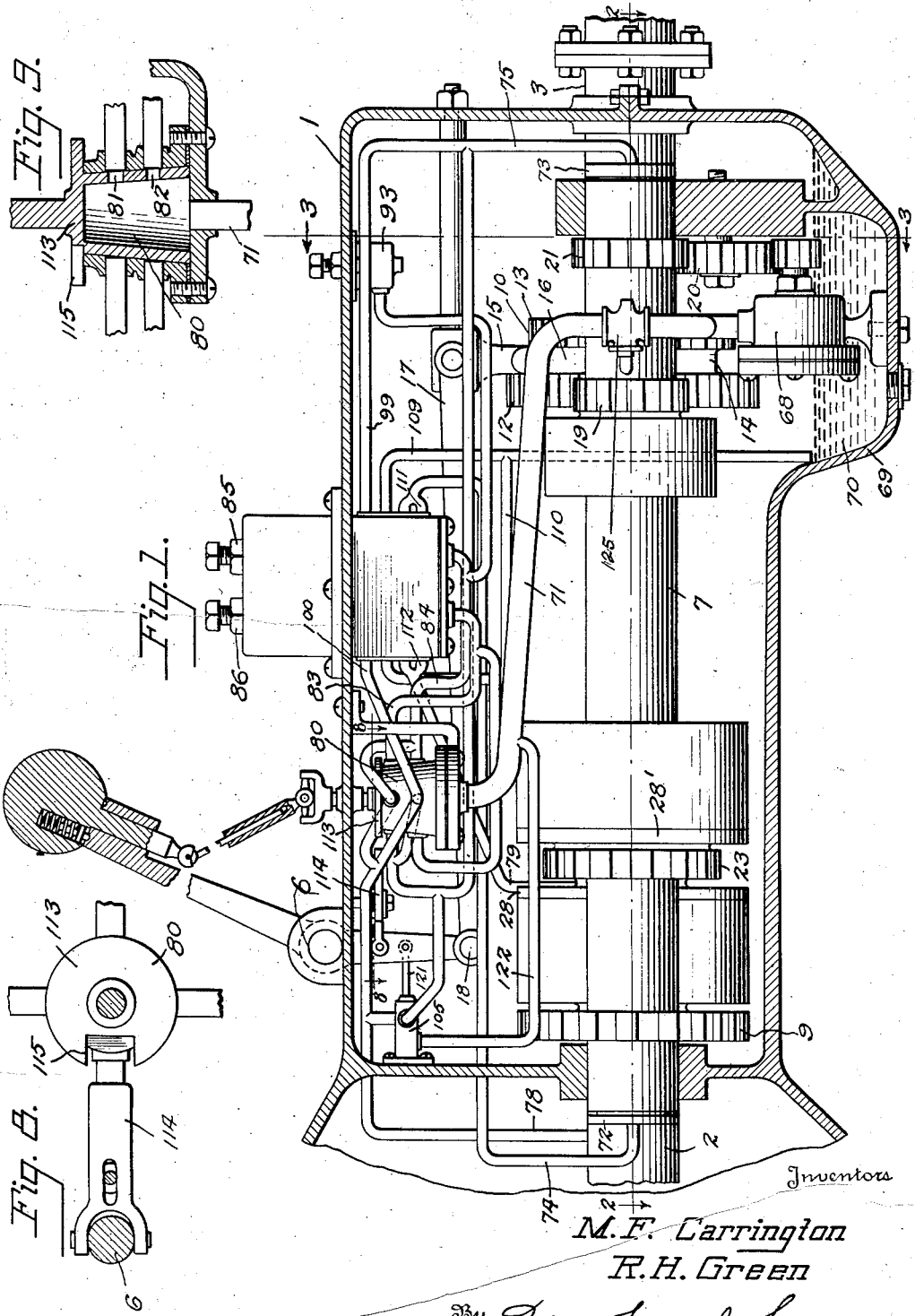
Inventors
M. F. Carrington
R. H. Green
By Mason Fenwick & Lawrence
Attorneys

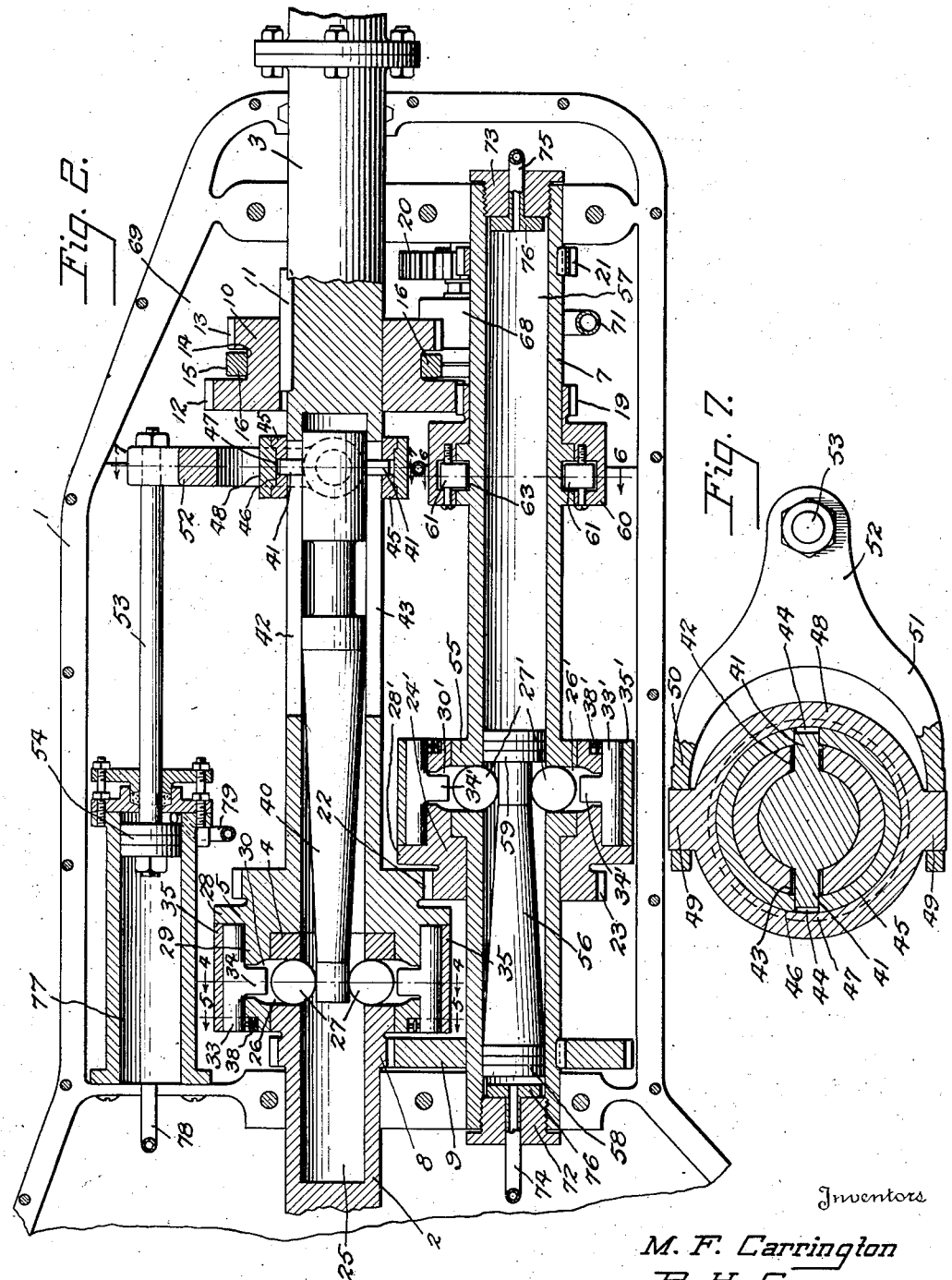

Sept. 15, 1936.      R. H. GREEN ET AL      2,054,747
TRANSMISSION MECHANISM
Filed Sept. 4, 1935      4 Sheets-Sheet 3
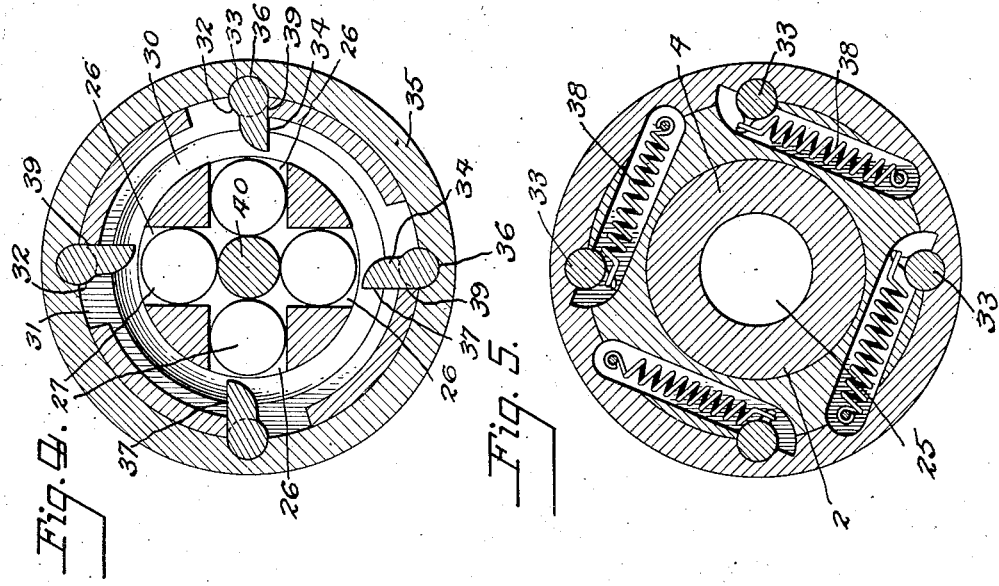
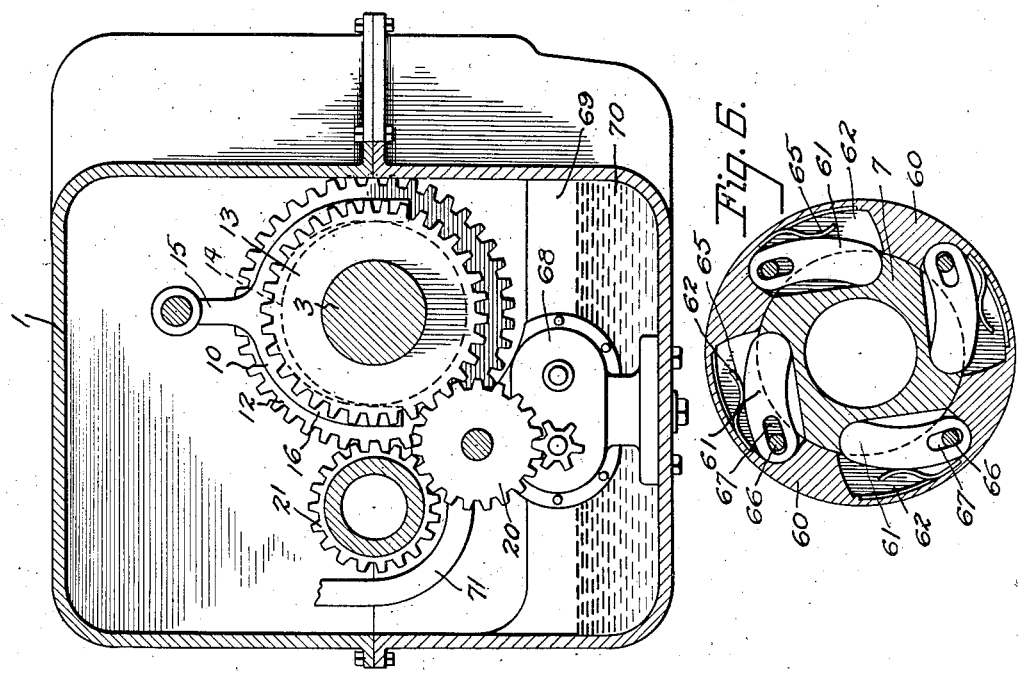
Inventors
M. F. Carrington
R. H. Green
By Mason Fenwick & Lawrence
Attorneys

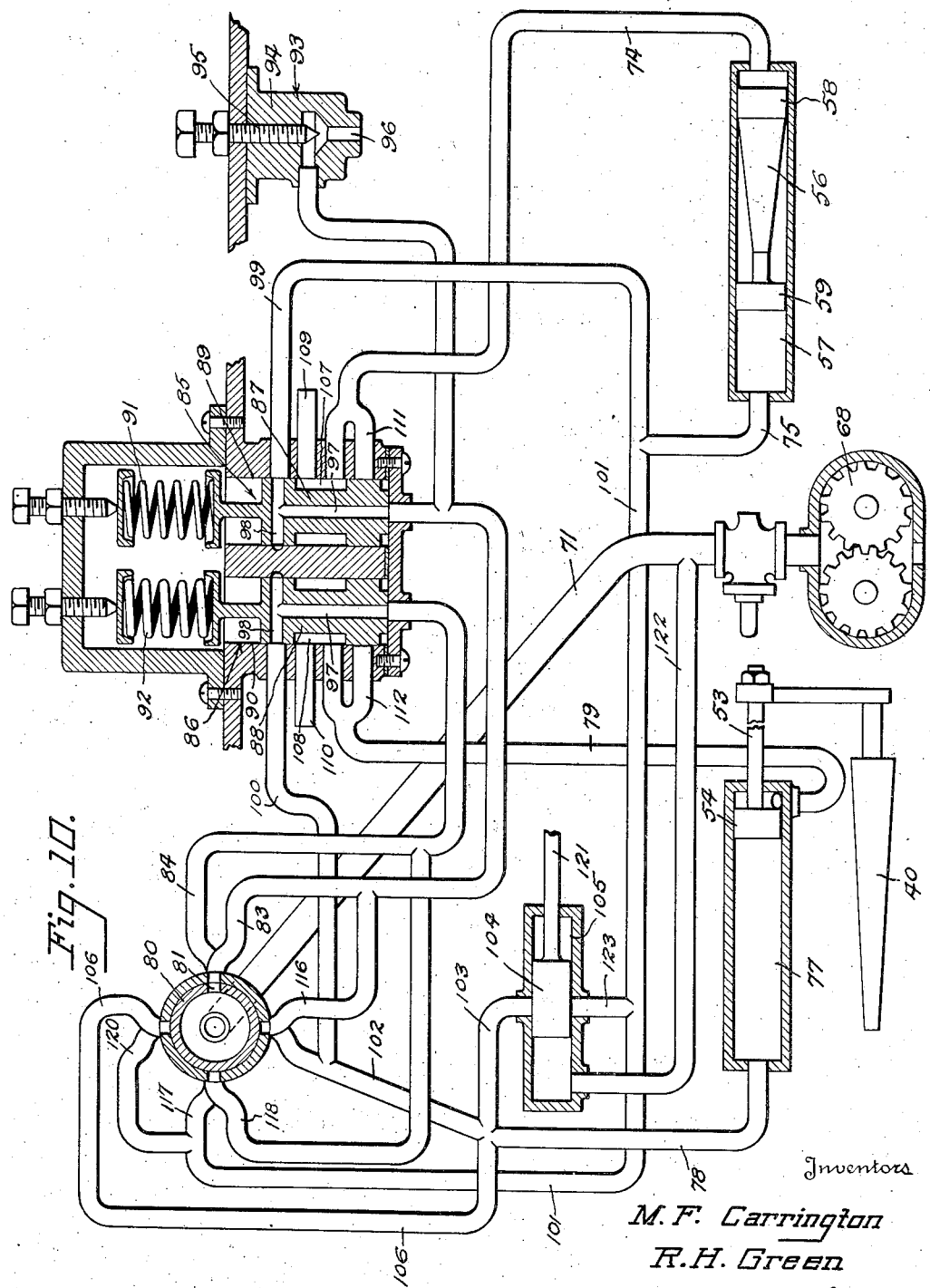

Patented Sept. 15, 1936

2,054,747

UNITED STATES PATENT OFFICE 2,054,747

TRANSMISSION MECHANISM

Robert H. Green and Marcellus F. Carrington, Philadelphia, Pa.

Application September 4, 1935, Serial No. 39,164

15 Claims. (Cl. 74—336.5)

This invention relates to transmission mechanism particularly adapted for auto vehicles.

It proposes a construction in which the transition from low to intermediate gear ratio and from intermediate to high or direct drive and vice versa is accomplished without the meshing and unmeshing of gears, so that silent and efficient change from one speed ratio to another is effected entirely independent of the expertness of the operator.

The invention provides a construction in which the transmission range is divided into two brackets, a manual range including reverse, neutral and low gear relationships, and an automatic range in which the transition is made from low gear through intermediate to direct drive, and back through intermediate to low, responsive to changes in the vehicle speed.

The invention provides that the automatic transition shall be accomplished through fluid pressure actuated instrumentalities, including on the one hand clutch elements associated respectively with the direct and intermediate transmission connections, and being positively moved to operative and inoperative positions, and on the other hand including a pair of automatic selectors associated with the intermediate and direct drive connections and resisting fluid pressure differentially whereby they come into operation successively as the fluid pressure increases or decreases responsive to variations in vehicle speed, thus producing successive action in the instrumentalities which they control.

The invention further includes among its objects a manual control in the form of a fluid pressure distributing valve by means of which the transmission mechanism may be selectively held in either direct drive, intermediate or low gear relationship during which periods the manual gear shift lever is locked against being moved into neutral position or reverse.

Still another object of the invention is to provide means for positively assuring the retraction of the direct drive and intermediate clutch elements so that it is impossible for the transmission lever to be moved to reverse position while any other gear connections are unreleased.

Other objects of the invention will appear as the following description of preferred and practical embodiments thereof proceeds.

In the drawings which accompany and form a part of the following specification and throughout the several figures of which the same characters of reference have been employed to designate identical parts:

Figure 1 is a side sectional view of a transmission mechanism embodying the principles of the present invention;

Figure 2 is a horizontal section taken along the line 2—2 of Figure 1;

Figure 3 is a section taken along the line 3—3 of Figure 1;

Figure 4 is a section taken along the line 4—4 of Figure 2;

Figure 5 is a section taken along the line 5—5 of Figure 2;

Figure 6 is a section taken along the line 6—6 of Figure 2;

Figure 7 is a section taken along the line 7—7 of Figure 2;

Figure 8 is a section taken along the line 8—8 of Figure 1;

Figure 9 is an axial section through the distributing control valve; and

Figure 10 is a vertical section through the automatic selectors also showing in a more or less diagrammatic manner the fluid pressure system and the instrumentalities appurtenant thereto.

Referring now in detail to the several figures and referring first to Figures 1 and 2, the numeral 1 represents a suitable housing into which extends on the one hand the clutch shaft 2 and on the other the propeller shaft 3. It will be understood from Figure 2 that the end 4 of the clutch shaft telescopes within a hollow hub 5 on the propeller shaft, said shafts normally being operatively disconnected so that while the clutch shaft 2 rotates whenever the engine is running and the engine clutch is thrown in, the propeller shaft 3 may remain stationary until put into operation through a function of the transmission mechanism.

There is a lay shaft 7 which is permanently connected to the clutch shaft 2 through the intermeshing gears 8 and 9 so that the lay shaft rotates whenever the clutch shaft 2 is rotating. A gear set 10 is slidably mounted on the propeller shaft 3 by means of a spline 11, said gear set comprising an integral body having a large gear 12 and a small gear 13 with an annular groove 14 in between. A yoke 15 having bifurcated arms 16 straddles the groove 14, permitting the gear set to rotate with the shaft 3 within said yoke. The upper end of said yoke is suitably attached to one end of a draw bar 17, the opposite end of which draw bar is connected at 18 to the lower end of the gear shift lever 6. The gear set 10 moves responsive to movements of the gear shift lever 6. In the rearward position of said lever as shown in Figure 1, the gear set is in its forward position in which the gear 12 is in mesh with the low gear 19 and the propeller shaft rotates through the low gear connection thus manually made. When the gear shift lever is moved to an intermediate position, both the gears 12 and 13 of the gear set 10 are released from any connection with the lay shaft 7. When the lever 6 is moved forwardly, the gear 13 on the gear set meshes with an idler gear 20 which is in mesh with the reverse gear 21. In this manner the direction of rotation of the propeller shaft is reversed.

The hub portion 5 of the propeller shaft is provided with a gear 22 in permanent mesh with a gear 23 normally freely revoluble relative to the lay shaft 7 and being mounted on the end of a clutch drum 24 by means of which the lay shaft may be connected upon occasion to the intermediate gear 22 on the propeller shaft.

The clutch mechanisms for connecting the engine clutch shaft in direct driving relation to the propeller shaft and for connecting the intermediate gear 23 to the lay shaft are similar and therefore the same characters of reference have been employed to designate identical parts in each, the characters being primed with respect to the intermediate gear clutch. Figure 2 shows that the engine clutch shaft is provided with a bore 25 adjacent its inner end from which radial apertures 26 debouch, opening in the outer surface of the said clutch shaft. Balls 27 are slidable radially in said apertures. Figure 4 shows that there are four such apertures 26, although their number is quite immaterial to the invention. That part of the hub 5 of the propeller shaft which telescopes over the end of the engine clutch shaft is of reduced diameter defining a radial flange 28 and a generally cylindrical sleeve 29. The sleeve on its interior is formed with an annular channel 30 in the zone of the apertures 26 and with slots 31 opening into said channel and in the outer surface of the sleeve 29. Adjacent its slot at one end thereof the sleeve 29 is formed with semi-cylindrical seats 32 receiving the pintles 33 of oscillating clutch dogs 34, said dogs extending through the slots 31 and into the annular channel 30. The clutch dogs are retained in place by an outer sleeve 35 which is provided with semi-cylindrical seats 36 complementary to the seats 32. The outer sleeve 35 is slipped over the sleeve 29, the seats 36 receiving the outer portions of the pintles of the clutch dogs and the dogs thus being retained in position.

The clutch dogs are provided on that side which lies away from the slot 31 with a straight face 37 adapted to ride over the balls in one direction of movement of the engine clutch shaft and on the side adjacent the slots, with a curved face adapted to be engaged by the balls for locking the clutch shaft and propeller shaft in direct driving relation. The clutch dogs are held by spiral springs 38 in an erect position, stopped against the ends 39 of the slots 31. When the propeller shaft overruns the engine clutch shaft as when the vehicle is going down hill, the clutch dogs 34 are tilted to the left referring to Figure 4, permitting the balls to push the clutch dogs aside against the tension of the springs 38, the clutch dogs being accommodated within the slots 31.

The pressure of the springs 38 is normally sufficient to overcome centrifugal force which might sometimes tend to resist the retraction of the balls 27. The clutch is positively operated by means of a taper pin 40 which slides in the bore 25 of the engine clutch shaft and in a continuation of said bore formed in the adjacent part of the propeller shaft. When the taper pin 40 moves to the leftward from the position shown in Figure 2, the balls 27 are pushed radially outward into the path of the ends of the dogs 39. When the taper pin is retracted, the balls move back out of the path of the ends of the dogs. The taper pin 40 has pins 41 slidable in and projecting through upper and lower slots 42 and 43 respectively and therefore the taper pin necessarily rotates with the propeller shaft. The projecting ends of the pins are received in holes 44 in a ring 45 journalled on the propeller shaft and which therefore rotates with it. Said ring is provided with an annular channel 46 in which seats an annular feather 47 formed on a non-rotating ring 48 which has trunnions 49 at its opposite ends journalled in the bifurcated arms 50 and 51 of a reciprocable operating yoke 52 which is connected by means of a rod 53 to a piston 54 by means of which the taper pin 40 is reciprocated in one or the other directions by fluid pressure means as will presently appear.

The clutch drum 24 has the flange 28', sleeve 29', annular channel 30 and dogs 34' mounted in a manner precisely similar to the dogs 34 and having an outer sleeve 35' slipped over said dogs and the sleeve 29' for holding the dogs in place. The dogs are engaged by balls 27' slidably mounted in radial apertures 26' formed in the collar 55 with which the lay shaft is provided. The balls 27' are spread by a taper pin 56 which reciprocates in a bore 57 in the lay shaft and has pistons 58 and 59 at its opposite ends adapting it to be operated through fluid pressure. The taper pin 56 is entirely free from any extraneous connection and therefore rotates with the lay shaft.

It is obvious from what has been described that the direct drive connection between the engine clutch shaft and propeller shaft as well as the clutch connection between the intermediate gear and the lay shaft are put in and out of operation through the agency of taper pins actuated by a fluid under pressure.

Since it is one of the purposes of the present invention that the normal position of the manual gear shift lever shall be in low gear throughout the automatic clutching of the intermediate gear as well as the direct drive, it is essential that the low speed gear on the lay shaft shall be connected thereto by an overrunning clutch to provide for high speeds of rotation of the low gear transmitted to it by the propeller shaft when in intermediate or direct drive connection, it being understood of course that the lay shaft rotates at a constant speed imparted to it by the gear train 8 and 9. This overrunning clutch is illustrated in Figures 2 and 6 and consists of a drum 60 freely rotatable on the lay shaft and of which the low gear 19 forms a part, said drum carrying pawls 61 recessible into slots 62 in said drum; but normally extending inwardly into recesses 63 formed in a collar 64 surrounding and forming a part of the lay shaft. The pawls 61 are pivoted adjacent one end and drop into the said recesses at their opposite ends, being biased in an inward position by springs 65. Preferably the pivotal connection of the pawls 61 with the drum 60 is of the pin and slot type as indicated at 66 and 67.

When the lay shaft 7 is travelling faster than the propeller shaft, it is obvious that the low gear 19 does the driving of the propeller shaft; when the propeller shaft is travelling at a higher rate of speed than the lay shaft it is apparent that the clutch overruns so that the low gear rotates with the speed acquired from the propeller shaft irrespective of the constant rate of rotation of the lay shaft.

Now, adverting to the fluid pressure actuating system, any convenient source of pressure may be provided, for example, the gear oil pump 68 which is preferably located in the sump 69 drawing oil from the body of oil 70 in the sump and delivering it under pressure through the trunk 71, the latter being provided with a safety valve 125. The oil pump as will be observed from Figures 1 and 3 is geared to the idler gear 20 and driven thereby. Thus oil pressure will be generated when the engine is running and will vary proportionately to the speed of the engine. Consequently, a factor of transmission control is provided which is, as it should be, directly proportional to the speed of the engine.

It will be observed in Figure 2 that the bore 57 of the lay shaft 7 constitutes a cylinder closed at each end by the plugs 72 and 73 and in which the taper pin 56 reciprocates as a piston. The plugs 72 and 73 are axially perforated and respective oil pipes 74 and 75 pass through said perforations and have any suitable anti-leakage means at their inner ends such for example as the disks 76 which seat against the inner faces of the plugs 72 and 73 and seal the joint between the fixed oil pipes 74 and 75 and the rotating lay shaft. With reference to the taper pin 40, it will be understood that the piston 54 which reciprocates the operating rod 53 moves within a fixed cylinder 77 having the oil pipes 78 and 79 opening thereinto on opposite sides of the piston. The object of the invention is to deliver oil under pressure from the trunk 71 to one or the other sides of the cylinders controlling these taper pins and simultaneously to vent the oil from the other side. It is also essential that means be provided for actuating the taper pin 56 at a lower oil pressure than the taper pin 40 so that the intermediate and direct driving connections will come into operation successively as the vehicle speed increases, and vice versa.

Figure 10 shows that the trunk 71 discharges into the body of a distributing valve 80. The distributing function of this valve will be brought out later on, but just at the present point in the description it may be regarded as a mere continuation of the trunk 71 and having upper and lower ports 81 and 82 for discharging oil into two pipes 83 and 84 which eventually communicate with the pipes 74 and 79 supplying pressure which throws the taper pins 56 and 40 into clutch engaging position. In between the distributing valve 80 and the cylinders which control the taper pins are the automatic selectors 85 and 86 which determine the successive operation of the intermediate gear clutch and the direct drive clutch. These selectors each comprise plunger valves 87 and 88 moving in cylindrical seats 89 and 90. These valves are lifted by oil pressure against the tension of springs 91 and 92 which normally bias them to closed position. The valve 87 controls the intermediate gear clutch while the valve 88 is concerned with the direct drive clutch. Oil comes to the selectors through the pipes 83 and 84 at the same pressure. The spring 91 which presses the valve 87 is however of lighter tension than the spring 92 so that as the pressure in the pipes 83 and 84 builds up responsive to increase in engine speed, the valve 87 will lift first. Later, that is to say, after continued increase in vehicle speed has sufficiently built up the pressure, the valve 88 will be lifted against the pressure of the spring 92. Since, due to the inertia of the vehicle the oil pressure will build up faster than the vehicle can acquire speed, it is necessary to provide some retardative instrumentality in the oil system to prevent the oil pressure from building up so fast that the transition from intermediate speed to direct drive will be substantially instantaneous. The invention therefore provides that a bleed valve 93 shall be interpolated at a suitable point in the system for flattening the peak of oil pressure rise by letting some of the oil discharge back into the sump. This valve comprises a casing 94, an adjustable needle valve 95 and a discharge port 96, the valve being conveniently connected with the pipe 83 which conducts oil to the intermediate selector.

Not only do the selectors govern the successive admission of oil to the engaging sides of the taper pin actuating cylinders, but they also control the venting of oil from the opposite ends of the cylinders and in the act of disengaging the clutch elements they control the reverse action of the fluid pressure with respect to both of the clutch operating cylinders. With this end in view, the selectors are provided with a system of ports which will be described piecemeal as their functions occur.

It being assumed that the distributing valve 80 is in the position shown in Figure 10 in which the ports 81 and 82 are in communication with the pipes 83 and 84, oil flows from the pump 68 through the trunk 71 to the hollow body of the valve 80 through the pipes 83 and 84 and to the bottoms of the respective selector valves. It will be noted that each of the valves has a central bore 97 and that the bore communicates with a transverse bore 98 and that the transverse bores communicate with pipes 99 and 100. Following the pipes 99 and 100, it is found that the pipe 99 is in communication with the release side of the cylinder 57, but that the piston 59 at this time is in its retracted position so that the movement of oil is blocked at this point. Following the branch pipe 101, it is found to lead to certain ports in the casing of the valve 80 which are at the time blocked through the position of the valve body. Tracing the pipe 100, it joins the branch pipe 102, of which the pipe 78 is a continuation and which communicates with the cylinder 25. Since the piston 54 is at the time in its retracted position, the movement of oil in the cylinder is blocked. Tracing the oil column from the pipe 102 to the branch 103 it is found blocked by the piston 104 in the cylinder 105, the function of which has not yet been described. Tracing the oil path from the pipe 102 in the opposite direction through the pipe 106, it is found blocked at the valve casing by a closed portion of the wall of the valve 80. Consequently, with respect to the oil pressure entering the bores 97 of both the plunger valves 87 and 88, it has no escape except through the bleed valve 93 which merely retards the building of pressure in the system. Consequently, as the pressure builds up it tends to lift both the plunger valves 87 and 88. Since the spring 91 which holds the plunger valve 87 to its seat is weaker than the spring 92 which holds the plunger valve against its seat, the plunger valve 87 lifts. Both plunger valves are provided with by-pass channels 107 and 108 and when the plunger valves are fully seated this by-pass channel places the clutch engaging sides of the cylinders 57 and 25 in communication with discharge pipes 109 and 110 which discharge into the sump. When the plunger valve 87 lifts it closes the pipe 74 to the discharge pipe 109 and opens the pipe 74 to the oil pressure through the branch pipe 111. Oil under pressure from the pipe 83 then flows through the lower part of the cylindrical valve chamber vacated by the plunger valve 87 and through the branch pipe 111 through the pipe 74 and into the cylinder 57 at the right end as viewed in Figure 10, urging the taper pin in a leftward or clutch engaging direction. At the same time, the by-pass channel 107 has moved up and placed the pipe 99 into communication with the discharge pipe 109, thus venting the oil from the left hand side of the cylinder 57 which is freely discharged before the advancing piston 59.

By referring to Figure 2, it will be understood that when the taper pin 56 moves thusly, it spreads the balls 27' and engages the clutch which locks the intermediate gear to the lay shaft, thus imparting the intermediate speed drive to the propeller shaft. At the same time since the spring 92 has not permitted the plunger valve 88 yet to open, the right hand end of the cylinder 25 remains vented through the by-pass channel 108 and discharge pipe 110 while pressure remains in the left hand side of the cylinder 25, holding the piston 54 retracted and the taper pin 40 in clutch release position.

It will be assumed that the vehicle speed is still increasing and the pressure in the system building up notwithstanding the bleeding at the valve 93. Shortly the pressure will have attained a value at which the spring 92 will be pushed back and the plunger valve 88 lifted from its seat, it being of course understood that the plunger valve 87 remains up and the taper pin 56 remains in clutch engaging position insofar as the intermediate gear connection is concerned. When the plunger valve 88 lifts the connection between the pipe 79 and discharge pipe 110 is broken and the pipe 79 put into communication with the bottom part of the plunger valve casing through the branch pipe 112. This permits fluid pressure from the pipe 84 to fill the lower vacated portion of the valve chamber, to pass through the branch pipe 112 through the pipe 79 to the right hand end of the cylinder 25, moving the piston 54 in the direction of the arrow. At the same time the by-pass channel 108 places the pipe 100 into communication with the discharge pipe 110 and the left hand end of the cylinder 25 is vented through the pipe 78, pipe 102 and pipe 100, thus permitting the piston 54 in its leftward excursion to freely force out the oil in front of it.

Referring now to Figure 2, it will be understood that as the piston 54 moves leftward, the taper pin 40 moves in a like direction and spreads the balls 27 engaging the direct drive clutch which connects the clutch shaft 2 and the lay shaft 3 directly together. Since the intermediate gear mechanism has remained in operative position it is obvious that the lay shaft will overrun the intermediate gear. This is permitted by the mechanism already described and best illustrated in Figure 4, it being understood that when the intermediate gear overruns the lay shaft, the balls 27' will press against the straight faces 39 of the clutch dogs canting the dogs over into the recess 31 and permitting the balls freely to pass beneath them. At this point, it may be stated that overrunning of the clutch which accomplished the direct drive takes place when the vehicle speed exceeds the engine speed imparted to the clutch shaft 2, thus providing free wheeling.

This automatic transition from low gear and from intermediate to direct drive is accomplished solely through progressive increase in the oil pressure incident to increase in the speed of the engine and is entirely automatic; so is the return from high speed through intermediate to low as the engine speed decreases, during which period the movements and functions of the parts are reversed.

It is quite essential in the interest of safety and for other reasons that the manual control of the auto vehicle insofar as neutral and reverse positions of the gear shift lever 6 are concerned should be altogether divorced from any automatic feature. Consequently, provision is made that the gear shift lever 6 can only be put into neutral or reverse positions manually, when the taper pins are assuredly withdrawn, and positively in clutch release position.

With this end in view, the distributing valve 80 is provided with a latching disk 113, Figures 1 and 8, rotatable therewith and arranged in such adjacency to a stop bolt 114 on the gear shift lever as to cause said stop bolt to engage said disk whenever it is attempted to move the gear shift lever, thus thwarting any attempt to move said lever excepting when the valve 80 is in the position shown in Figure 10 in which when the engine clutch is thrown out for making the shift with the gear shift lever, the oil pump is not operating for there is no oil under pressure and the taper pins 40 and 56 are assuredly in retracted position.

The movement of the gear shift lever when the valve is in this optimum position for assuming manual control, is determined by a notch 115 in the periphery of the disk 113 which notch is in alignment with the locking bolt 114 when the valve is in the desired position and permits the locking bolt 114 to enter said notch, making room for the gear shift lever 6 to be moved either to neutral or reverse positions.

The purpose, structure and functioning of the distributing valve 80 will now be described. This valve imposes a manual modification upon the range of automatic operation. For example, it might be that climbing a fairly steep hill the engine speed would increase sufficiently to automatically throw the transmission into direct drive, but the additional load would at once diminish the speed so that the transmission would automatically drop back to intermediate. Being relieved of the load, the speed would increase and once more the transmission would go into direct drive, causing a continual changing of gear ratios which would be decidedly objectionable. Again the hill might become so steep that the vacillation would be between low gear and intermediate gear ratios. Sometimes at idling speed, it may be desirable to keep the transmission mechanism in direct drive for the load may be small at this time and the engine perfectly capable of propelling the car in high gear at low speed. In the first example, it is desirable to confine the automatic operation to the intermediate gear range. In the second example, to lock it in low gear and the third example to lock it in high gear. The distributing valve performs these three manually incited functions.

For example, assuming that it is desired to confine the automatic actuation of the transmission to the intermediate gear range. The distributing valve 80 is moved clockwise until the ports 81 and 82 are in registry with the mouths of the pipes 102 and 116. Now, tracing the oil under pressure which enters the pipes 102 and 116, the oil which traverses the pipe 116 presses upon the plunger valve 87 and lifts the transmitting oil under pressure through the branch pipe 111 and pipe 74 to the right hand end of the cylinder 57, forcing the taper pin which actuates the intermediate gear clutch to clutch engaging position.

Tracing the oil through the pipe 102, it enters the left hand end of the cylinder 25 and holds the piston 54 and with it the taper pin 40 in retracted position. There is no possibility of the plunger valve 88 being lifted from its seat and consequently, it is impossible for any increase in the speed of the vehicle to shift the gear relation from intermediate to direct drive.

Now, assuming that it be desired to limit the automatic actuation of the transmission mechanism to the direct driving range; the valve 80 is moved clockwise until the ports 81 and 82 are in registry with the pipes 117 and 118. Fluid pressure then flows into these pipes and its course may be traced as follows; through pipe 118 to pipe 84 and to the bottom of the plunger valve 88, lifting the same and permitting the oil under pressure to flow through the branch pipe 112, pipe 79 to the right hand end of the cylinder 25 moving the piston 54 and with it the taper pin 40 to the left, that is to say, to the clutch engaging position of the direct drive. Tracing the oil pressure through the pipe 117, it traverses the pipe 101 and the pipe 75 entering the left hand side of the cylinder 57, and maintaining the piston 59 and taper pin 56 in fully retracted position. There are other branches from the pipe 101 which may be traced, but in every instance they will be found to terminate in a blind end.

Now, supposing that it is desired to lock the transmission mechanism in low gear, the distributing valve is moved until the ports 81 and 82 are in registry with the pipes 106 and 120. Tracing the path of the active oil column, it will be found to traverse the pipe 106, the pipe 78 to the left hand side of the direct drive cylinder holding the piston 54 and taper pin 40 fully retracted. Tracing the oil flow through the pipe 120, it will be found to pass through the pipe 101 to the left hand end of the intermediate gear cylinder 57 holding the piston 59 and taper pin 56 in fully retracted position. Thus both of the automatic clutches are maintained in release position and the gear shift lever is in low gear position permitting operation of the vehicle in low gear, but in view of the fact that when the distributing valve 80 is in the last named or fourth position, the notch 115 is out of alignment with the locking bolt 114 and therefore the gear shift 11 cannot be moved to neutral or reverse gear connections and is confined to the low gear position.

As a rule, a fully automatic transmission mechanism is discountenanced in view of the fact that any mechanical device which is a complete substitute for intelligent direction or operation is apt to be deficient in some factor of safety. The present invention is believed to have foreseen every contingency which involves the factor of safety and to have fully provided therefor. For example, supposing one should be travelling with the distributing valve 80 in the second or third position, that is to say, with the automatic operation confined either to direct drive or intermediate gear positions. This means that either the taper pin 40 or the taper pin 56 will be in clutch engaging position and the transmission will be locked either in direct drive or intermediate gear. Assuming that the engine should stop with the parts in this position, the pressure would immediately fall to zero with no active means for throwing out of operation that one of the taper pins which was in clutch engaging position.

This condition would not be corrected by moving the distributing valve 80 around to full automatic position, that is to say, the position shown in Figure 10 for the valve only acts when the oil pressure is present. Consequently, the situation might arise in which one might have the gear shift lever in reverse gear position when first throwing in the clutch and yet at the same time one of the taper pins would be in locked position with regard to one of the automatic clutches. The result would probably be disastrous to the transmission mechanism.

In order to assure that both taper pins will be in retracted position before the operator of the vehicle can possibly shove the gear shift lever into reverse gear position, the cylinder 105 is provided having the piston valve 104 which by means of a piston rod 121 is connected to the gear shift lever 6 as shown in Figure 1. A pipe 122 leads directly from the trunk 71 to the forward or left hand end of said cylinder and it points lower down in said cylinder in the mouths of the pipes 103 and 123, the latter connecting with the pipe 101. When the operator shoves the gear shift lever to neutral position on the way to reverse gear position, the piston valve 104 is drawn to the right as viewed in Figure 10, exposing the mouths of the pipes 103 and 123 so that oil under pressure from the pipe 122 is communicated through the pipe 103 to the pipe 78 and the left hand side of the cylinder 25 and through the pipes 101 and 75, to the left hand side of the cylinder 57, throwing back into release position which ever taper pin was in clutch engaging position.

The piston valve 104 is extremely important when making a sudden stop, for when the vehicle is travelling in direct drive, for example, and one suddenly throws the gear shift lever into neutral, the opening of the pipes 103 and 122 at once releases the pressure in the engaging ends of the clutch actuating cylinders and applies it to the release ends of said cylinders, immediately forcing the taper pins into their release positions without it being necessary to wait for the inertia of the parts involved in the automatic operation of the transmission mechanism to die down.

In operation, the distributing valve will normally be set to occupy the position indicated in Figure 8 in which position the gear shift lever can be shifted from low to neutral or reverse positions. With the parts in position shown in Figure 8, it is merely necessary to start the engine, throw in the clutch and as the speed climbs the transmission mechanism will pass from low to intermediate and finally from intermediate to high. At any time while the engine is running and it may be deemed desirable, the distributing valve may be turned to lock the transmission mechanism in any one of the speed gear ranges desired. It will of course be understood that one would not attempt to lock it in high gear until the speed of the engine had attained the automatic gear ratio range which it is desired to maintain. Before stopping the engine the operator would normally turn the distributing valve 80 back to its full automatic position in which both taper pins automatically withdraw as the speed decreases to the low gear range. If however, the operator neglects or forgets to turn the distributing valve back to fully automatic position, the cylinder 105 and piston 104 will take care of this omission insofar as safely reversing the vehicle is concerned. Before being able to get beyond low gear the operator will have to turn the distributing valve to fully automatic position and this fact will naturally overcome any forgetfulness on the part of the operator.

While we have in the above description defined what we believe to be a preferred and practical embodiment of the invention, it will be understood that the specific details as shown and described are merely by way of example and not to be construed as limiting the broad concept of the invention as defined in the appended claims.

What we claim is:

1. Transmission mechanism for auto vehicles including a driving and a driven member having reverse, neutral and low gear shifting positions, and intermediate and direct drive clutching connections between driving and driven elements, manual means for shifting from neutral to reverse or low, or vice versa, a fluid conduit and means for producing a fluid pressure in said conduit varying in value directly as the speed of the driving member, fluid pressure motors with which said conduit communicates, for operating said clutching connections, and means for applying fluid pressure to said motors in directions positively to engage and positively to release said clutch connections, said means being responsive to drop in pressure for keeping said clutch connections released when the speed of the driving member falls below that at which the value of the fluid pressure ceases to operate the clutching means, and means for inhibiting manual actuation of the gear shifting means except when said fluid pressure applying means is in clutch-release position so that manual actuation of the gear shifting means can be done without conflicting with a higher speed connection.

2. Transmission mechanism for auto vehicles including a driving and a driven member having reverse, neutral and low gear shifting positions, and intermediate and direct drive clutching connections between driving and driven elements, manual means for shifting from neutral to reverse or low, or vice versa, a fluid conduit, and means for producing fluid pressure in said conduit varying in value directly as the speed of the driving member, fluid pressure motors for operating said clutching connections, with which said conduit communicates, and fluid pressure operated selector valves in said conduit differentially resistant to fluid pressure for admitting fluid pressure to the motor which actuates the intermediate clutching connection prior to the admission of fluid pressure to the motor which actuates the direct drive connection.

3. Transmission mechanism for auto vehicles as claimed in claim 2, including means for flattening the curve of the building up pressure in said conduit to produce sufficient time interval prior to and after actuation of said intermediate clutch connection to permit the vehicle to have acquired the speed at which the higher speed ratio connections can be successfully maintained.

4. Transmission mechanism for auto vehicles including a driving and a driven member having reverse, neutral and low gear shifting positions, and intermediate and direct drive clutching connections between driving and driven elements, said clutching connections including expansive clutch elements and respective taper pins axially reciprocable into and out of operative engagement with said expansive clutch elements, manual means for shifting from neutral to reverse or low, or vice versa, a fluid pressure system, and means for producing a fluid pressure in said system varying in value directly as the speed of the driving member, fluid pressure motors intercalated in said system, for operating said taper pins, and selectors in said system differentially responsive to fluid pressure for admitting fluid pressure to the motor which actuates the intermediate clutching connection prior to the admission of fluid pressure to the motor which actuates the direct drive connection, and means for flattening the curve representing the building up pressure in said system to produce sufficient time interval prior to and after actuation of said intermediate clutch connection, to permit the vehicle to have acquired the speed at which the higher speed ratio connections can be successfully maintained.

5. Transmission mechanism for auto vehicles including a driving and a driven member having reverse, neutral and low gearing shifting positions, and intermediate and direct drive clutching connections between driving and driven elements, manual means for shifting from neutral to reverse or low, or vice versa, a fluid pressure system, and means for producing fluid pressure in said system varying in value directly as the speed of the driving member, fluid pressure motors intercalated in said system for operating said clutching connections, and selectors in said system controlling said motors, said selectors comprising plunger valves so ported as when in normal closed position to place the taper pin retracting ends of said fluid pressure motors into communication with the pressure end of said system and the opposite ends of said motors into communication with a discharge, and when lifted, to reverse the pressure and discharge ends of said system with respect to said fluid pressure motors, springs of differential strength biasing said valves into closed position, the spring which closes the selector controlling the intermediate clutching connection being the weaker, whereby the latter selector is lifted for admitting fluid pressure to the motor which actuates the intermediate clutching connection, prior to the admission of fluid pressure to the motor which actuates the direct drive connection.

6. Transmission mechanism for auto vehicles including a driving and driven member having reverse, neutral and low gear shifting positions, and intermediate and direct drive clutching connections between driving and driven elements, said clutching connections including expansive clutch elements, and respective taper pins axially reciprocable into and out of operative engagement with said expansive clutch elements, manual means for shifting from neutral to reverse or low, or vice versa, a fluid pressure system, and means for producing fluid pressure in said system varying in value directly as the speed of the driving member, fluid pressure motors intercalated in said system for operating said driving taper pins, and selectors in said system differentially responsive to fluid pressure for admitting fluid pressure to the motor which actuates the intermediate clutching connection prior to the admission of fluid pressure to the motor which actuates the direct drive connection, said selectors comprising plunger valves adapted to be lifted by fluid pressure, so ported as when in normal closed position to place the taper pin retracting ends of said fluid pressure motors into communication with the pressure end of said system and the opposite ends of said motors into communication with a discharge, and when lifted to reverse the pressure and discharge ends of said system with respect to said fluid pressure motors.

7. Transmission mechanism as claimed in claim 6, the means for producing differential action of said selectors comprising springs normally biasing them to closed position, the spring which biases the selector controlling the intermediate clutching connection being the weaker.

8. Transmission mechanism for auto vehicles including a driving and driven member having reverse, neutral and low gear shifting positions, and intermediate and direct gear clutching connections between driving and driven elements, manual means for shifting from neutral to reverse or low, or vice versa, a fluid pressure system including selectors successively responsive to speed variations of the driving member for automatically successively engaging the intermediate and direct drive clutching connections as the speed of the driving member increases, and manual setting means selectively operable to modify the automatic operation of said transmission mechanism to hold it in low, intermediate or direct speed ratio, whenever the fluid pressure value is high enough to operate the transmission mechanism automatically, said setting means comprising a valve communicating on the one hand with the source of fluid pressure, and on the other, communicable selectively with branches of fluid pressure system that operate either of the selectors to the exclusion of the other, at all pressure values, or permits the operation of neither, keeping the transmission mechanism in low gear.

9. Transmission mechanism as claimed in claim 8, said setting means having a fourth position in which the automatic functions of said transmission mechanism are unrestricted by said valve.

10. Transmission mechanism as claimed in claim 8, said setting means having a fourth position in which the automatic functions of said transmission mechanism are unrestricted by said valve, and means moveable with said valve for permitting the shifting of said manual shifting means from low gear position only when said setting means is in said fourth position.

11. Transmission mechanism for auto vehicles including a driving and driven member having reverse, neutral and low gear shifting positions, and intermediate and direct drive clutching connections between driving and driven elements, said clutching connections including expansive clutch elements and respective taper pins axially reciprocable into and out of operative engagement with said expansive clutch elements, manual means for shifting from neutral to reverse or low, or vice versa, a fluid pressure system, and means for producing fluid pressure in said system varying in value directly as the speed of the driving member, fluid pressure motors intercalated in said system for operating said taper pins, selectors in said system differentially responsive to fluid pressure for admitting fluid pressure to the motor which actuates the intermediate clutching connection prior to the admission of fluid pressure to the motor which actuates the direct drive connection, said selectors comprising plunger valves adapted to be lifted by fluid pressure, so ported as when in normal closed position, to place the taper pin retracting ends of said fluid pressure motors into communication with the pressure end of said system, and the opposite ends of said motors into communication with a discharge, and when lifted, to reverse the pressure and discharge ends of said system with respect to said fluid pressure motors, setting means determining that the automatic operation of the transmission mechanism shall be confined selectively to low gear ratio, intermediate gear ratio or direct drive, while ever the fluid pressure value is high enough to operate the transmission mechanism automatically, said setting means comprising a valve communicating on the one hand with the source of fluid pressure and on the other communicable selectively with branches of the fluid pressure system that operate either of the selectors to the exclusion of the other, at all pressure values or permits the operation of neither, keeping the transmission mechanism in low gear, said valve having a fourth position in which the automatic functions of said transmission mechanism are unrestricted by said valve.

12. Transmission mechanism comprising an engine clutch shaft, a lay shaft and a driven shaft, said lay shaft being in permanent driven connection with said clutch shaft, a permanently meshed low ratio gear set comprising gears on said lay and driven shafts, one of said gears being overrunningly clutched to its shaft, a direct clutch connection between said engine clutch shaft and said driven shaft, the adjacent ends of said clutch shaft and driven shaft being hollow and telescoping, expansible clutch elements intruding into the hollow of said shafts when contracted, a taper pin in said hollow reciprocable to expand said clutch elements into clutch engaging position, a cylinder, a piston in said cylinder, a connection between said piston and taper pin for reciprocating the latter while allowing rotation of said driven shaft, an oil pump driven from said lay shaft, and an oil pressure system having its pressure and discharge sides connected to opposite ends of said cylinder, and means for reversing the relation of said pressure and discharge sides with respect to said cylinder.

13. Transmission mechanism comprising an engine clutch shaft, a lay shaft and a drive shaft, said lay shaft being in permanent driven connection with said clutch shaft, a permanently meshed low ratio gear set comprising gears on said lay and driven shafts, one of said gears being overrunningly clutched to said shaft, a direct clutch connection between said engine clutch shaft and said driven shaft, the adjacent ends of said clutch shaft and driven shaft telescoping and having axially aligned bores, expansible clutch elements intruding into the bore of said shafts when contracted, a taper pin in said bore reciprocable to expand said clutch elements into clutch engaging position, a cylinder, a piston in said cylinder, a connection between said piston and taper pin for reciprocating the latter while allowing rotation of said driven shaft, an oil pump driven from said lay shaft, and an oil pressure system having pressure and discharge sides connected to opposite ends of said cylinder, an intermediate gear set including permanently meshed gears on said lay and driven shafts, one of said gears being clutched to said lay shaft by an expansive clutch, said lay shaft being hollow in the zone of said clutch and functioning as a cylinder, clutch elements intruding into the hollow of said lay shaft when said clutch is released, a taper pin in said hollow shaft having pistons at its ends and being reciprocable through the zone of said clutch to expand the said clutch elements into position of engagement, said oil pressure system having its pressure and discharge sides connected to opposite ends of said cylinders, and means for reversing the relation of the pressure and discharge sides of said system with respect to said cylinders.

14. Transmission mechanism as claimed in claim 13, including a gear shift lever, and a valve in said oil pressure system operated directly by said gear shift lever for bringing the automatic operation of said transmission mechanism immediately to an end by connecting the pressure side of said oil pressure system to the clutch release ends of said cylinders.

15. Transmission mechanism as claimed in claim 13, including selectors operable under differential oil pressure for determining sectional operation of the intermediate gear connection and the direct drive connection in the order named, a control valve for selectively determining the operation of either of said selectors to the exclusion of the other or inhibiting the action of both, said valve having a position in which the automatic operation of the transmission mechanism is unaffected, a reverse gear, a manual gear shift lever for shifting from low gear to neutral and reverse or vice versa, and means moveable with said valve for permitting the operation of said gear shift lever only when said valve is in the position permitting unaffected automatic operation of the transmission mechanism.

ROBERT H. GREEN.
MARCELLUS F. CARRINGTON.